June 15, 1965 P. GRASSO 3,189,185
SEAL AND SEAL RACK
Filed Jan. 23, 1962 2 Sheets-Sheet 1

INVENTOR.
PHILIP GRASSO
BY Harold R. Beck
ATTORNEY

June 15, 1965  P. GRASSO  3,189,185
SEAL AND SEAL RACK

Filed Jan. 23, 1962  2 Sheets-Sheet 2

INVENTOR.
PHILIP GRASSO
BY *Harold R. Beck*
ATTORNEY

3,189,185
SEAL AND SEAL RACK

Philip Grasso, Stanford, Calif., assignor to Rexall Drug and Chemical Company, Los Angeles, Calif., a corporation of Delaware
Filed Jan. 23, 1962, Ser. No. 168,127
1 Claim. (Cl. 211—59)

The present invention is directed to a rack for conveniently storing seals used on plastic kitchenware. Various sizes and shapes of these seals are used in homes today and present a storage problem when not in use. If the seals are stored in a kitchen drawer, the larger seals frequently cover the smaller seals thus making them difficult to locate. My invention is a rack which may be affixed to a wall or cabinet in the kitchen, and permits storage of various sizes and shapes of seals in a convenient location and in a manner that permits quick and simple selection and use of the seals.

My invention is further directed to a unique connecting tab on the seals for releasably affixing the seals to the above described rack.

In the drawings I have shown a present preferred embodiment of my invention in which.

Figure 1:
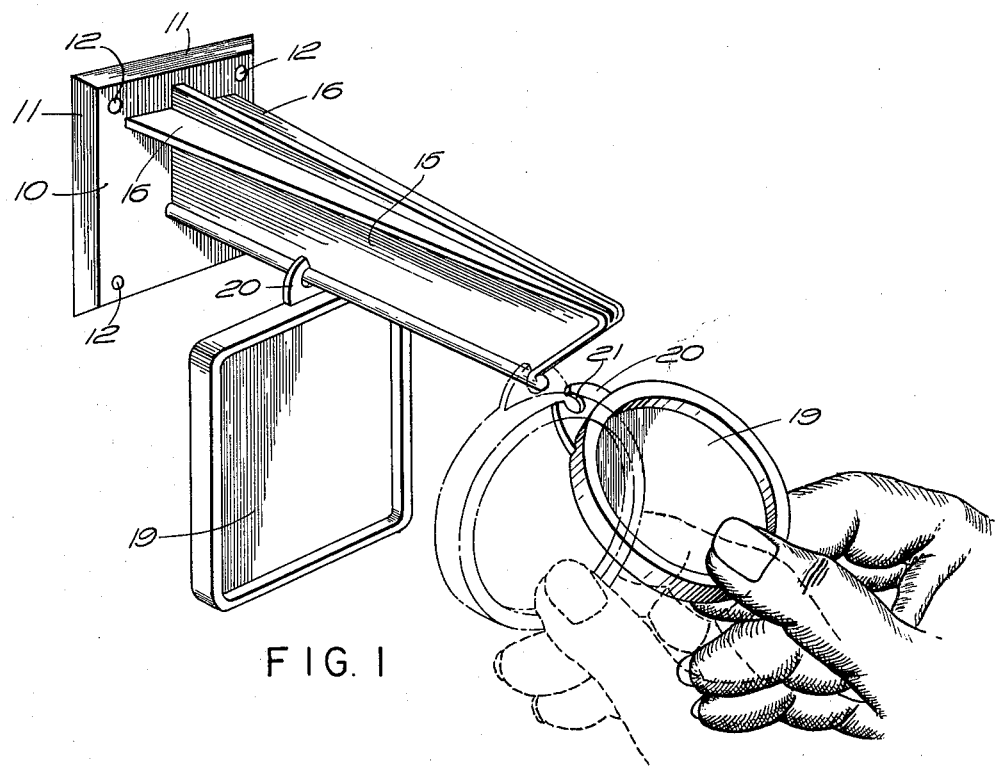
FIGURE 1 is a perspective of my seal rack with a seal attached and a second seal positioned for attachment.
Figure 2:
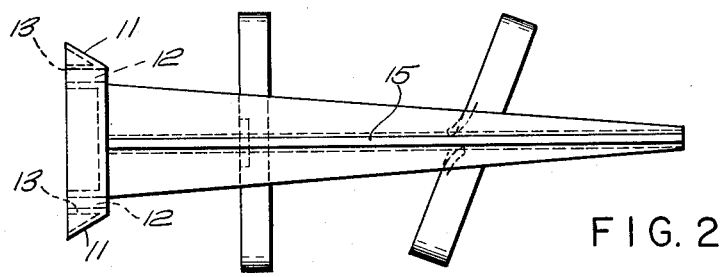
FIGURE 2 is a top plan view of my seal rack with a seal attached and a second seal positioned to be removed.

Briefly the present invention comprises a rack having a vertical mounting plate attachable to a rigid structure such as a kitchen wall or cabinet, an elongated, vertically extending plate affixed normal to the mounting bracket thereby protruding from the wall or cabinet, and a cylindrical bead affixed along the lower edge of the vertical plate. The seals which are stored on the rack are of known construction as illustratively shown in Tupper Patent No. 2,487,400 but each include an integral tab having a circular keyhole shaped or U-shaped opening positionable around the bead on the rack to releasibly maintain the seals on the rack.

Referring specifically to the drawings, the rack includes a mounting bracket having a front wall 10 with integral peripheral walls 11 and four openings 12 within integral cylindrical sleeves 13 and extending through wall 10. The openings 12 and sleeves 13 receive a conventional metal screw for securing the mounting bracket to a kitchen wall or cabinet. Preferably the mounting bracket has an integral reinforcing rib 14 to insure rigidity in the bracket.

A vertical plate 15 extends substantially normal to and is integral with the plate 10 of the mounting bracket. A gusset plate 16 is affixed between each side of the plate 15 and the front face of the plate 10 to add rigidity to the plate 15. The plates 16 are desirable, but not necessary. The plates 16 improve the appearance of the rack and, of course, may be modified for aesthetic reasons.

Figure 3:
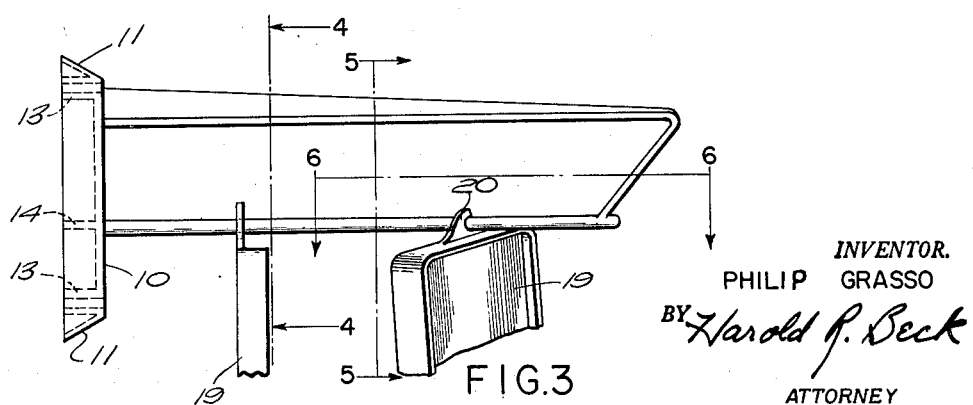
FIGURE 3 is a side elevation view of my seal rack with a seal attached and a second seal positioned to be removed.

A cylindrical bead 17 is affixed to and along the entire lower edge of the vertical plate 15 and portions of the bead extend transversely on each side of the plate 15. The outermost edge of plate 15 is tapered downwardly and bead 17 extends forward of the plate 15 as shown in FIGURES 1 and 3. The bead 17 may have configurations other than cylindrical, however, I have found this preferred embodiment to be superior in overall use of the rack.

Figure 6:
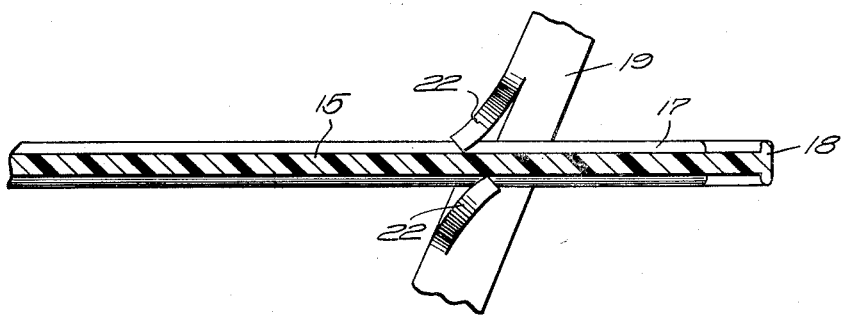
FIGURE 6 is a cross-section taken on line 6—6 on FIGURE 3.

The front tapered edge of plate 15 has an integral transversely extending rib 18, as shown in FIGURE 6. Rib 18 extends transversely beyond each side of plate 15.

Figure 4:
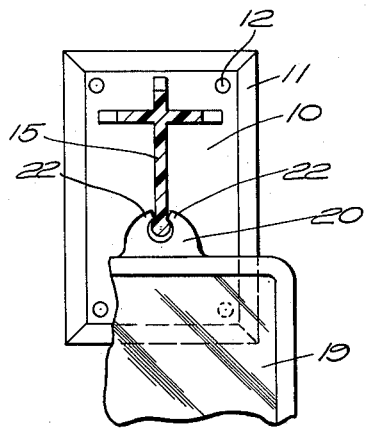
FIGURE 4 is a cross-section taken on line 4—4 of FIGURE 3.

The seal 19 is of well known construction, as previously described, and includes a central wall with an integral peripheral rim wall an outwardly extending tab 20 having a circular, U-shaped or key hole type opening 21. The opening extends to the edge of the tab and has two inwardly directed legs 22 which are positioned on top of the circular rib 17 in the manner shown in FIGURE 4 when opening 21 is positioned around rib 17. The seal 19 and tab 20 are preferably fabricated from regular polyethylene and thus have a flexibility and resiliency permitting elastic deformation. The rack is preferably fabricated from linear polyethylene thereby being rigid and non flexible.

In FIGURES 1, 2, 3 and 4, I have shown a seal (nearest the mounting bracket) with its tab 20 engaged with bead 17. A plurality of such seals are normally mounted on the bead thereby permitting quick visual recognition of the desired seal. Preferably the rack will support 12 to 20 seals.

Figure 5:
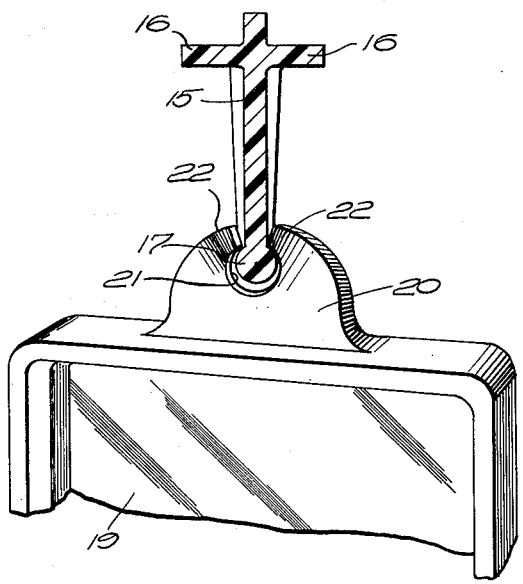
FIGURE 5 is a cross-section taken on line 5—5 of FIGURE 3.

The seal may be removed from the bear by merely pulling straight down on the seal, however I have shown in FIGURES 5 and 6 the preferred method of removing the seal. As shown in FIGURES 5 and 6 the seal is twisted obliquely to the plate 15 and bead 17 thereby forcing the legs 22 outward due to the edges of opening 21 engaging the bead 17. The seal is then pulled downward and the legs 22 easily disengage the bead 17.

In attaching a seal to the rack, the tab 20 may be pushed upward with the opening 21 aligned with the bead 17 until legs 22 snap over the top of the bead. However, the preferred method of attachment includes aligning the opening 21 immediately below bead 17 and twisting the seal obliquely while pushing upward until legs 22 snap over the top of the bead.

A seal may be attached to or removed from any position along rib 17. This permits storage of the larger seals close to the mounting bracket to avoid hiding the small seals.

The transverse rib 18 adds aesthetic appeal to the rack and also prevents removal of the seals by pulling the seal off the end of bead 17.

I have shown a preferred embodiment of the opening 21 as circular in tab 20, however it is within the scope of my invention to use an oval, triangular, etc. opening with bead 17 conforming to the shape of the opening. My drawings also show the opposed edges of legs 22 slanted toward each other to direct the bead 17 into the circular portion of opening 21.

While I have described the present preferred embodiment of my invention, it may be otherwise embodied within the cope of the following claim.

I claim:

A rack adapted to store container seals, said rack including a vertical mounting bracket adapted to be secured to a rigid surface, a vertical plate affixed and extending substantially normal to said bracket, said vertical plate having a horizontally extending lower edge, and a vertically extending front edge, a gusset plate affixed to said mounting bracket and additionally extending from each side of said vertical plate at the upper portion thereof and convergent toward said vertically extending front edge, a cylindrical rib integral with and extending along said entire lower edge, portions of the rib extending outwardly from the sides of the vertical plate; a second rib integral with and extending along said vertically extending front edge of the plate, portions of the second rib extending outwardly from the sides of the vertical plate.

References Cited by the Examiner

UNITED STATES PATENTS

| | | | |
|---|---|---|---|
| 354,943 | 12/86 | Slaughter | 211—59 |
| 542,255 | 7/95 | Henkel | 248—304 |
| 740,229 | 9/03 | Carpenter. | |
| 1,527,386 | 2/25 | Barnard | 211—59 X |
| 2,126,980 | 8/38 | Sears | 211—57 X |
| 2,271,504 | 1/42 | Kees et al. | 248—298 X |
| 2,273,668 | 2/42 | Steiner | 211—57 |
| 2,285,745 | 6/42 | Ritter | 211—94 |
| 2,487,400 | 11/49 | Tupper | 150—0.5 |
| 2,732,870 | 1/56 | Nichols | 150—0.5 |
| 2,895,616 | 7/59 | Erdmann | 211—59 |
| 2,907,586 | 10/59 | Paxton et al. | 211—50 X |

FOREIGN PATENTS

| | | |
|---|---|---|
| 96,926 | 1960 | Norway. |
| 222,142 | 12/58 | Australia. |

FRANK L. ABBOTT, *Primary Examiner.*

CLAUDE A. LE ROY, *Examiner.*